United States Patent [19]

Shibutani et al.

[11] Patent Number: 5,570,219

[45] Date of Patent: Oct. 29, 1996

[54] OPTICAL TRANSMITTER FOR SUBCARRIER FREQUENCY MULTIPLEXED OPTICAL TRANSMISSION SYSTEM

[75] Inventors: Makoto Shibutani; Toshiharu Yasugi; Akihiro Kanazawa, all of Tokyo, Japan

[73] Assignee: NEC Corporation, Japan

[21] Appl. No.: 491,084

[22] Filed: Jun. 16, 1995

[30] Foreign Application Priority Data

Jun. 21, 1994 [JP] Japan .................................... 6-138825

[51] Int. Cl.$^6$ .................................................. H04J 14/02
[52] U.S. Cl. .......................................... 359/125; 359/161
[58] Field of Search ........................... 359/124–125, 359/126, 132, 157, 161, 167, 181

[56] References Cited

U.S. PATENT DOCUMENTS

| | | | |
|---|---|---|---|
| 4,933,929 | 6/1990 | Tajima | 359/133 |
| 5,283,679 | 2/1994 | Wedding | 359/124 |

FOREIGN PATENT DOCUMENTS

| | | | |
|---|---|---|---|
| 359205 | 9/1989 | European Pat. Off. . | |
| 0477699 | 4/1992 | European Pat. Off. | 359/124 |
| 632608 | 5/1994 | European Pat. Off. . | |
| 0187144 | 9/1985 | Japan | 359/132 |
| WO91/15927 | 10/1991 | WIPO . | |

OTHER PUBLICATIONS

Lo, "A Hybrid Lightwave Transmission System for Subcarrier Multiplexed Video and Digital B–ISDN Services in the Local Loop", Journal of Lightwave Technology, vol. 7, No–11, Nov. 1989, pp. 1839–1848.

Kanazawa et al., "Pre–Clipping Method to Reduce Clipping–Induced Degradation in Hybrid Analog/Digital Subcarrier–Multiplexed Optical Transmission Systems", IEEE Photonics Technology Letters, vol. 7, No. 9, Sep. 1995, pp. 1069–1071.

A. H. Gnauck, et al., "Comparison of Direct and External Modulation For CATV Lightwave Transmission at 1.5 πm Wavelength", Electronics Letters, vol. 28, No. 20, Sep. 24, 1992, pp. 1875–1876.

Maeda, et al., "Analysis of BER of 16QAM Signal in AM/16QAM Hybrid Optical Transmission System", Electronics Letters, vol. 29, No. 7, Apr. 1, 1993, pp. 640–642.

Ho, et al., "Equalization Technique to Reduce Clipping–Induced Nonlinear Distortion in Subcarrier–Multiplexed Lightwave Systems", IEEE Photonics Technology Letters, vol. 5, No. 9, Sep. 1993, pp. 1100–1103.

Primary Examiner—Leo Boudreau
Assistant Examiner—Kinfe-Michael Negash
Attorney, Agent, or Firm—Ostrolenk, Faber, Gerb & Soffen, LLP

[57] ABSTRACT

The subcarrier frequency multiplexed optical transmission system disclosed is one in which a plurality of analog subcarrier signals and at least one digital subcarrier signal is optically transmitted by frequency multiplexing. The system includes an amplitude limiter, a filter, a multiplexer and a semiconductor laser. Portions of the analog subcarrier signals which are lower in level than the threshold value of the semiconductor laser are eliminated by the amplitude limiter, and further impulse distortions generated due to clipping in the frequency band of the digital subcarrier signal are eliminated by the filter. Then, the analog and digital subcarrier signals are frequency multiplexed to be inputted to the semiconductor laser. The system enables to reduce the transmission quality deterioration of digital subcarrier signal caused by clipping.

8 Claims, 4 Drawing Sheets

OPTICAL TRANSMITTER FOR SUBCARRIER FREQUENCY MULTIPLEXED OPTICAL TRANSMISSION SYSTEM

BACKGROUND OF THE INVENTION

(1) Field of the Invention

The present invention relates to subcarrier frequency multiplexed optical transmission systems, and more particularly to an optical transmitter for subcarrier frequency multiplexed optical transmission systems, such as for cable television (CATV) systems.

(2) Description of the Related Art

In recent years, cable television (CATV) systems in which digital subcarrier signals are transmitted via optical fibre for new services such as bi-directional image transmission in addition to analog subcarrier signals for conventional television (TV) broadcast services, are attracting attentions. Such analog/digital hybrid optical transmission CATV is reported in detail in, for instance, Yoneda, "Status of Development of Optical Subscriber Transmission Systems", the Optical Communication Symposium of the Institute of Electronics and Communication Engineers of Japan, 1993, OCS93-8S.

Where a number of such frequency multiplexed subcarriers are simultaneously optically transmitted, it is necessary to note a phenomenon of clipping of the output light waveform that is caused when modulation signal inputted to an LD (Laser Diode) as transmission light source momentarily becomes lower than a threshold level. Particularly, where analog subcarrier signals adopting vestigial sideband amplitude modulation (VSB-AM) are transmitted for conventional TV broadcast services, the phenomenon is highly possible because it is necessary to set a high optical modulation degree to ensure a large carrier-to-noise ratio (CNR). When the clipping occurs, momentary distortion (i.e., impulse distortion) is generated to greatly deteriorate the quality of digital subcarrier signal transmission. Effects of the clipping on the digital subcarrier signal transmission are detailed in, for instance, Maeda et al, "Analysis of 16QAM-signal's BER in AM/16QAM Hybrid Optical Transmission", the Transactions of the Institute of Electronics and Communication Engineers of Japan, Spring 1993, B-997.

SUMMARY OF THE INVENTION

An object of the invention is to realize, in a subcarrier frequency multiplexed optical transmission system in which analog and digital subcarrier signals are simultaneously transmitted, a method of subcarrier frequency multiplexed optical transmission, which permits avoiding or reducing transmission quality deterioration of digital subcarrier signal due to clipping.

According to one aspect of the invention, there is provided a subcarrier frequency multiplexed optical transmission system in which a plurality of analog subcarrier signals and at least one digital subcarrier signal are optically transmitted by frequency multiplexing, the system comprising:

an amplitude limiter for limiting the amplitude of the plurality of analog subcarrier signals;

a filter for eliminating distortions and noise components in the frequency band of the digital subcarrier signal, from outputs of the amplitude limiter;

a multiplexer for multiplexing the analog subcarrier signals outputted from the filter and the digital subcarrier signal; and a light source for modulating output signal light intensity according to the analog and digital subcarrier frequency signals outputted from the multiplexer.

According to another aspect of the invention, in the above optical transmission system, the amplitude limiter limits one of a positive amplitude and a negative amplitude of a signal inputted thereto, and the light source is a semiconductor laser.

According to still another aspect of the invention, in the above optical transmission system, the amplitude limiter limits both positive and negative amplitudes of a signal inputted thereto, and the output signal light intensity is modulated by an external modulation system.

According to the invention, of the analog subcarrier signals, those portions which are lower than the threshold level of the LD are preliminarily eliminated by an amplitude limiter, and further distortion and noise components generated in the digital subcarrier signal frequency band are eliminated by a filter. Then, the resultant analog and digital subcarrier signals are frequency multiplexed to be applied to the LD. In this case, since the analog subcarrier signal portions which are lower than the threshold level of the LD have been eliminated by the amplitude limiter, no substantial clipping occurs when the LD modulation is made. Although the passing of signals through the amplitude limiter results in the generation of impulse distortions over a wide frequency range, those impulse distortions which are generated in the digital subcarrier signal frequency band are eliminated by a filter. Further, impulse distortion generated in the analog subcarrier signal frequency band is very small when time averaged, so that it has substantially no effect on the analog subcarrier signals.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Figure 1:
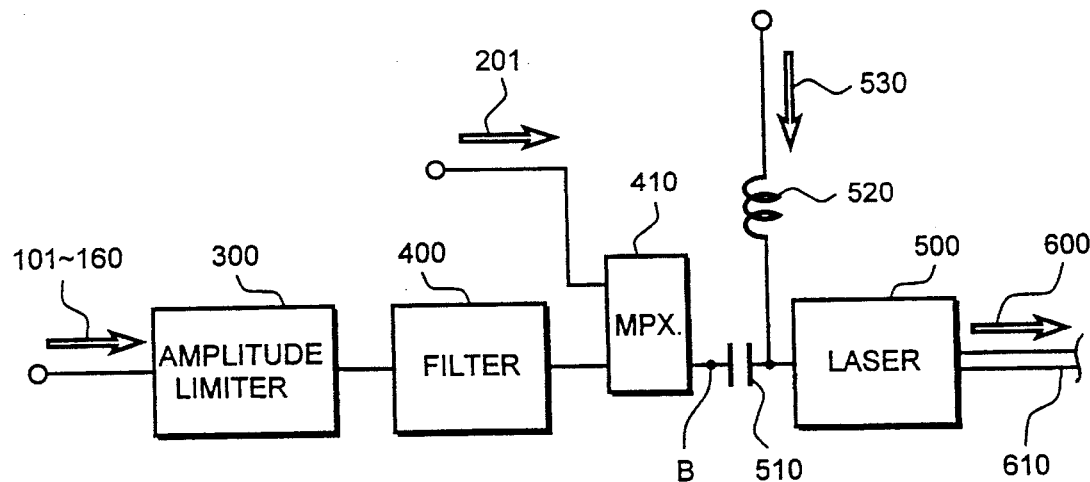
FIG. 1 is a schematic diagram showing a first embodiment of the optical transmitter according to the invention.

A first embodiment of the optical transmitter according to the invention has a structure as shown in FIG. 1. In this embodiment, 60 channel analog subcarrier signals 101 to 160 and a single channel digital subcarrier signal 201 are frequency multiplexed for optical transmission. The analog subcarrier signals 101 to 160 are spaced apart at a frequency interval of 6 MHz in a frequency range from 55.25 MHz to 409.25 MHz. They are modulations by the vestigial sideband amplitude modulation (VSB-AM) method. The digital subcarrier signal 201 is a modulation by 16QAM modulation and with a center frequency of 600 MHz, a clock frequency of 16 MHz and a roll-off factor of 50%.

Figure 2:
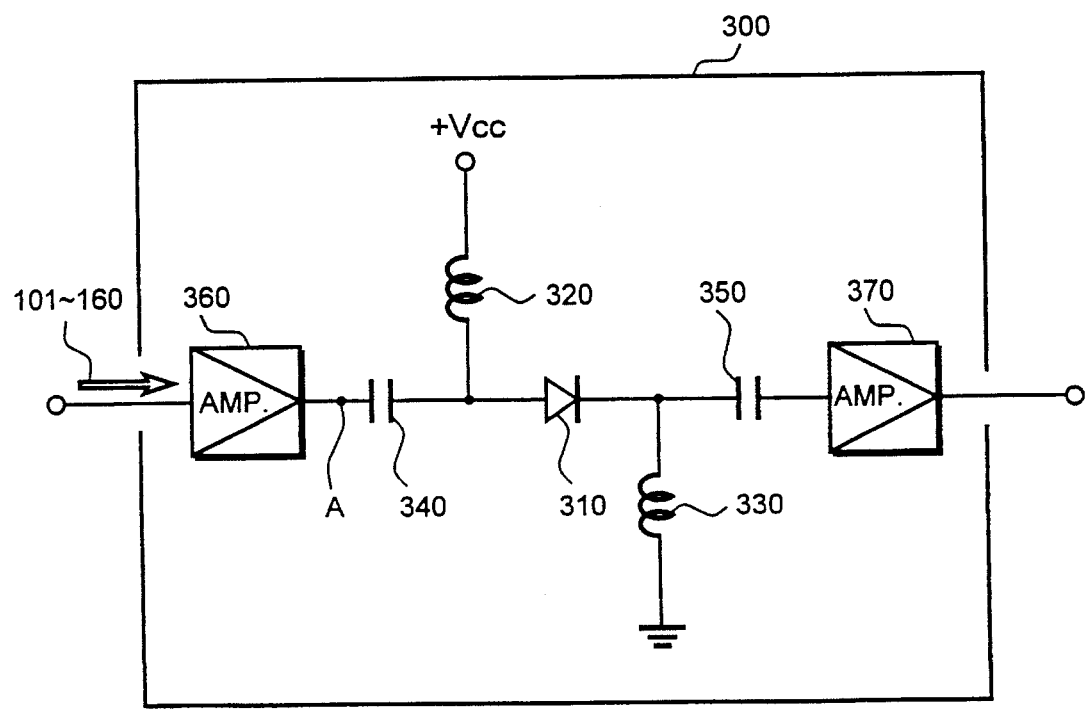
FIG. 2 is a schematic diagram showing an amplitude limiter used in the first embodiment of the invention.
Figure 3:
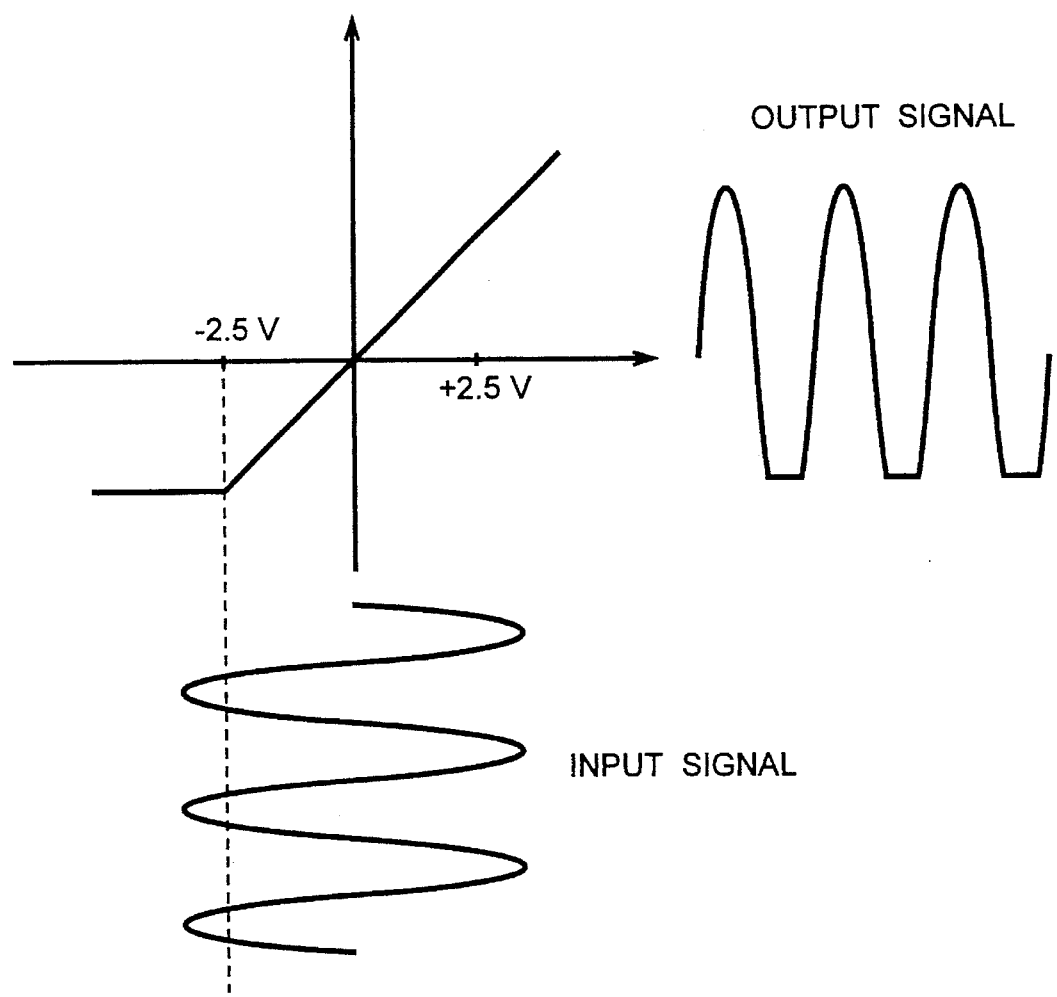
FIG. 3 is a graph showing an input-output characteristic of the amplitude limiter used in the first embodiment of the invention.

As shown in FIG. 1, the analog subcarrier signals 101 to 160 are inputted to an amplitude limiter 300. FIGS. 2 and 3 show the structure of the amplitude limiter 300 and the input-output characteristic thereof, respectively. The amplitude limiter 300 has a diode 310 in series in the signal line. Bias voltage +Vcc is applied across the diode 310 through the inductors 320 and 330 for blocking high frequency signals. In the drawings, reference numerals 360 and 370 represent an input buffer amplifier and an output buffer amplifier, respectively. Reference numerals 340 and 350 represent coupling capacitors. When the high frequency potential at point A in FIG. 2 is −2.5 volts or above, the diode 310 is "on". When the high frequency potential becomes lower than −2.5 volts, the diode 310 is turned off. The analog subcarrier signals 101 to 160 are amplified by an input buffer amplifier 360 to an output voltage amplitude (zero peak value) of 125 millivolts per subcarrier. The individual analog subcarrier signals 101 to 160 are not correlated to one another. Normally, the potential at the point A is thus −2.5 volts or above, and the diode 310 is "on". At the moment when the analog subcarrier signals 101 to 160 come to be in phase with one another, causing the potential at the point A to become lower than −2.5 volts, the diode 310 is turned off. Consequently, the analog subcarrier signals 101 to 160 are clipped.

The output of the amplitude limiter 300 contains impulse distortions which are generated as a result of the amplitude limiting and distributed over a wide frequency band. Of these distortions, those which are generated in the frequency band of the digital subcarrier signal 201 are eliminated by a filter 400. In this embodiment, the filer 400 used is of a band rejection type with a center frequency of 600 MHz and a cutoff frequency bandwidth of 40 MHz. The impulse distortions generated in the frequency band of the analog subcarrier signals 101 to 160 are very small, i.e., −75 dBc or below in time average distortion ratio. Therefore, they have substantially no effects on the transmission of the analog subcarrier signals.

The analog subcarrier signals 101 to 160 outputted from the filter 400 are multiplexed in a multiplexer (MPX.) 410 with the digital subcarrier signal 201. The resultant output from the multiplexer 410 is coupled through a DC blocking capacitor 510 to a semiconductor laser 500. The semiconductor laser 500 has its bias current threshold set to 20 mA, and is biased with a bias current 530 of 70 mA through a high frequency blocking inductor 520. Input impedance of the semiconductor laser 500 with respect to DC and high frequency signals is adjusted to 50 ohms. At point B in FIG. 1, the analog and digital subcarrier signals 101 to 160 and 210 have respective voltage amplitudes (zero peak values) of 125 and 12.5 millivolts per subcarrier. The output signal light 600 thus has been intensity modulated with modulation degrees of 5 and 0.5%. When the high frequency potential at point B in FIG. 1 becomes lower than −2.5 volts, the injection current in the semiconductor laser 500 becomes lower than the threshold value, thus producing clipping in the output signal light. However, since the portions of the analog subcarrier signals 101 to 160 which are lower in level than −2.5 volts have been eliminated in advance, substantially no clipping is produced in the semiconductor laser 500.

Experiments were conducted by using this embodiment of the optical transmitter. With 60 channel analog subcarrier signals the output signal light was modulated with an optical modulation degree of 5% per subcarrier. It was found that there is substantially no digital subcarrier signal deterioration due to clipping. It was thus possible to obtain transmission free from code error. In the case of using the prior art optical transmitter, on the other hand, clipping effect on digital subcarrier signal was produced from modulation of the output signal light with optical modulation degree of 5% with 60 channel analog subcarrier signals. In this case, the code error factor could not be held within $10^{-5}$. It was found that with the prior art optical transmitter the analog subcarrier signal optical modulation degree has to be held within 3.8% in order to transmission free from code error. By using this embodiment of the optical transmitter, the analog signal subcarrier signal optical modulation degree could be increased by about 2.4 dB, thus permitting corresponding reception CNR improvement and transmission distance extension.

Figure 4:
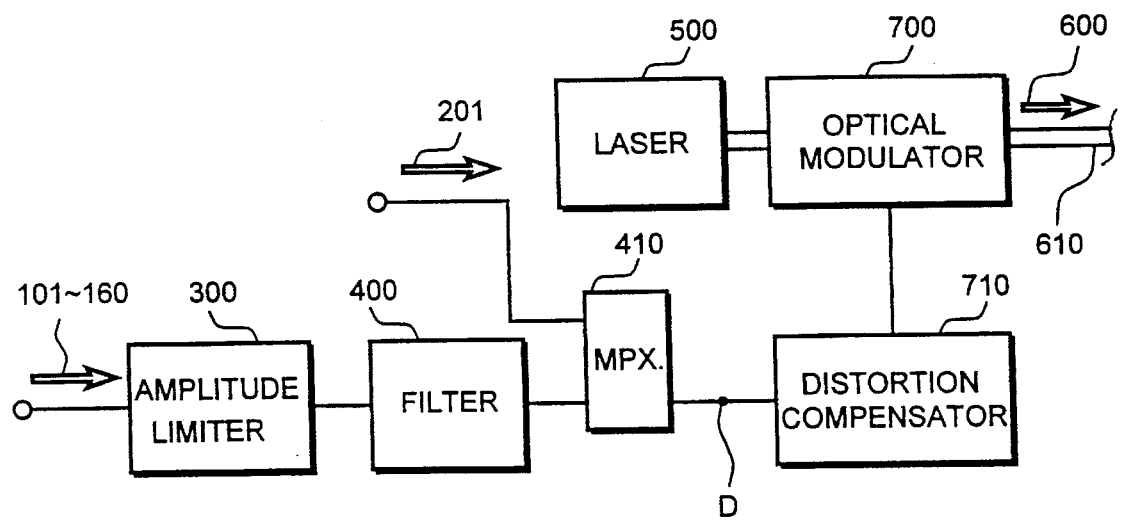
FIG. 4 is a schematic diagram showing a second embodiment of the optical transmitter according to the invention.
Figure 5:
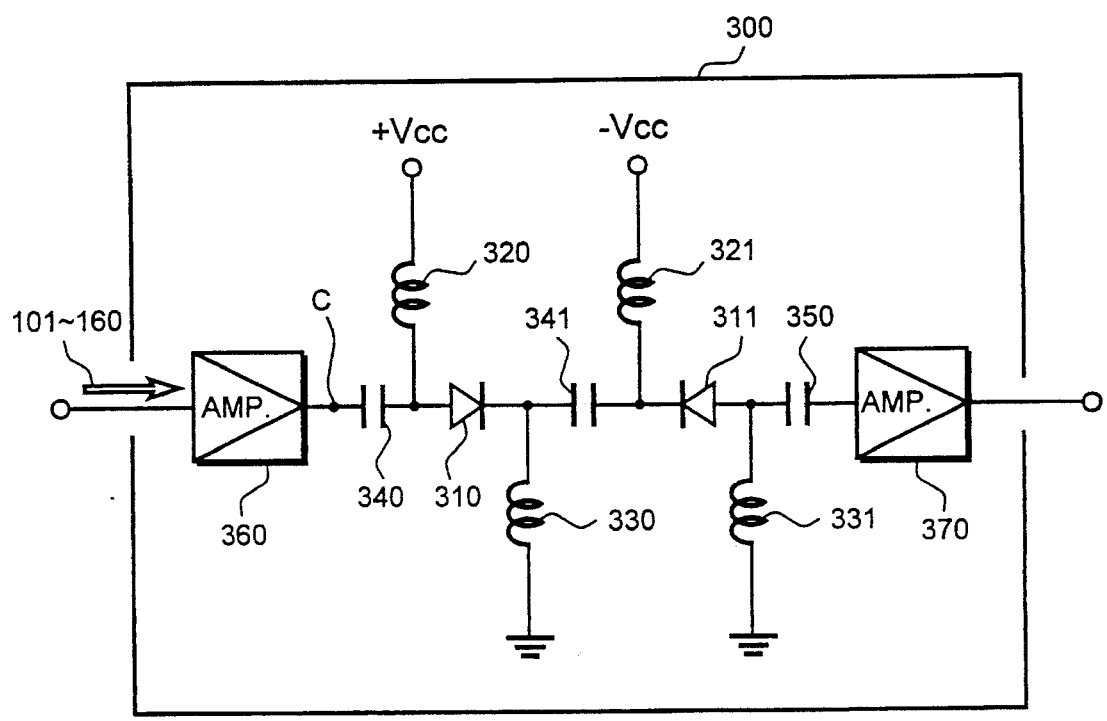
FIG. 5 is a schematic diagram showing an amplitude limiter used in the second embodiment of the invention.
Figure 6:
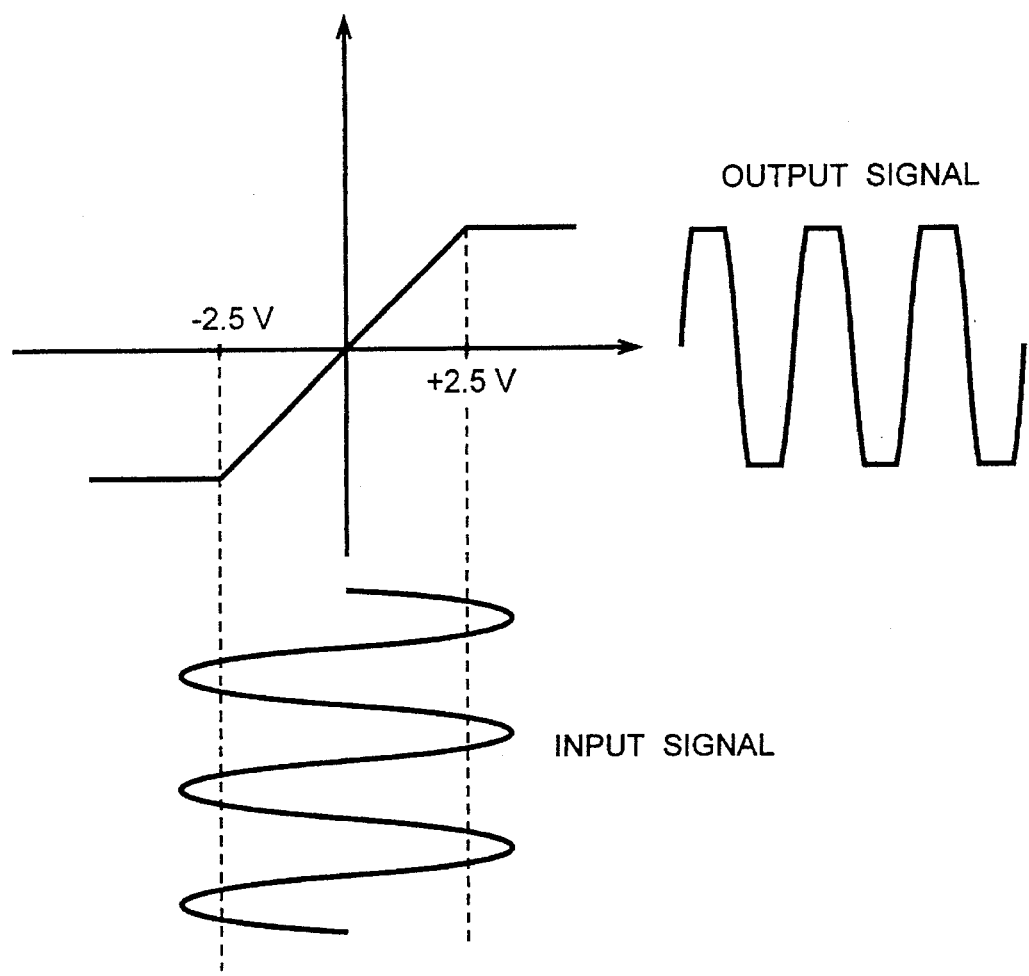
FIG. 6 is a graph showing an input-output characteristic of the amplitude limiter used in the second embodiment of the invention.

FIG. 4 shows a second embodiment of the optical transmitter according to the invention. This embodiment employs an external modulation system for output signal light intensity modulation. FIGS. 5 and 6 show the structure and input-output characteristic, respectively, of an amplitude limiter 300 used in the second embodiment. Here, the same 60 channel analog subcarrier signals 101 to 160 and digital subcarrier signal 201 as in the preceding first embodiment are the transmission signals.

As shown in FIG. 5, the amplitude limiter 300 in this embodiment includes two diodes 310 and 311 which are inserted in series and have opposite senses. A bias voltage +Vcc is applied to the diode 310 through the high frequency blocking inductors 320 and 330. A bias voltage −Vcc is applied to the diode 311 through the high frequency blocking inductors 321 and 331. Reference 360 represents an input buffer amplifier, 370 represents an output buffer amplifier, and 340, 341 and 350 represent coupling capacitors. When the high frequency potential at point C is −2.5 volts or below, the diode 310 is "off". When the high frequency potential is above 2.5 volts, the diode 311 is "off". Thus, as shown in FIG. 6, the amplitude limiter 300 is "on" when the C point potential is in a range from −2.5 volts to 2.5 volts, and is turned off when the C point potential gets out of this range. The analog subcarrier signals 101 to 160 are thus clipped symmetrically on the plus and minus sides.

Like the first embodiment, the output of the amplitude limiter 300 is inputted to a filter 400 for elimination of impulse distortions in the frequency band of the digital subcarrier signal 201. The analog subcarrier signals 101 to 160 outputted from the filter 400 are multiplexed in a multiplexer (MPX.) 410 with the digital subcarrier signal 201. The output of the multiplexer 410 is coupled through a distortion compensator 710 to be inputted to an optical modulator 700. In this embodiment, the optical modulator 700 is an LiNbO$_3$ Mach-Zehnder modulator (LN modulator).

The LN modulator is detailed in, for instance, Doi et al, "Fabrication of highly stable LiNbO$_3$ analog modulator", Proceedings of the 1992 IEICE Fall Conference, Page 4–193, 1992, C-171. The optical modulator 700 modulates the intensity of signal light 600 outputted from the semiconductor laser 500. While the optical modulator 700 has a sinusoidal modulation characteristic, with the provision of the distortion compensator 710 it is possible to obtain substantially linear modulation of the intensity of the signal light 600. The distortion compensation with this distortion compensator is detailed in, for instance, in A. H. Gnauck et al, "Compensation of Direct and External Modulation for CATV Lightwave Transmission at 1.5 μm Wave-length", Electronics Letters, Vol. 28, 1992, pp. 1875–1876.

At the input of the distortion compensator 710 (i.e., point D in FIG. 4), the analog and digital subcarrier signals 101 to 160 and 201 have respective voltage amplitudes (zero peak values) of 125 and 12.5 millivolts per subcarrier, thus providing respective optical modulation degrees of 5 and 0.5% for the modulation of the output signal light 600. The distortion compensator 710 can compensate for the characteristic of the optical modulator 700 when its input voltage amplitude is 2.5 volts or below. If the input voltage amplitude exceeds 2.5 volts, it results in great distortion generated at the time of the optical modulation. In this embodiment, however, portions of the analog subcarrier signals 101 to 160 that are above 2.5 volts in amplitude have been eliminated in advance, and thus no distortion is generated when the signal light 600 is modulated.

As has been described in the foregoing, according to the invention, in a subcarrier frequency multiplexed optical transmission system in which analog and digital subcarrier signals are transmitted simultaneously, it is possible to reduce the digital subcarrier signal transmission quality deterioration caused by clipping. It is thus possible to increase the optical modulation degree with respect to the analog subcarrier signals, thus permitting corresponding reception CNR improvement and transmission distance extension.

While the invention has been described in its preferred embodiments, it is to be understood that the words which have been used are words of description rather than limitation and that changes within the purview of the appended claims may be made without departing from the true scope and spirit of the invention.

What is claimed is:

1. A subcarrier frequency multiplexed optical transmission system in which a plurality of analog subcarrier signals and at least one digital subcarrier signal are optically transmitted by frequency multiplexing, said system comprising:

an amplitude limiter for limiting the amplitude of the plurality of analog subcarrier signals;

a filter connected to the output of the amplitude limiter for eliminating distortions and noise components in the frequency band of said digital subcarrier signal;

a multiplexer for multiplexing the analog subcarrier signals outputted from the filter and the digital subcarrier signal; and a light source for modulating output signal light intensity according to the analog and digital subcarrier frequency signals outputted from said multiplexer.

2. The optical transmission system according to claim 1, in which said amplitude limiter limits one of a positive amplitude and a negative amplitude of a signal inputted thereto, and said light source is a semiconductor laser.

3. The optical transmission system according to claim 1, in which said amplitude limiter limits both positive and negative amplitudes of a signal inputted thereto, and said output signal light intensity is modulated by an external modulation system.

4. The optical transmission system according to claim 1, in which said amplitude limiter comprises:

an input buffer amplifier having an input node for receiving said plurality of analog subcarrier signals and an output node;

a diode having an anode coupled to the output node of said input buffer amplifier and a cathode, said diode being forward-biased through high frequency blocking inductors; and an output buffer amplifier having an input node coupled to the cathode of said diode and an output node connected to said filter.

5. The optical transmission system according to claim 1, in which said amplitude limiter comprises:

an input buffer amplifier having an input node for receiving said plurality of analog subcarrier signals and an output node;

a first diode having an anode coupled to the output node of said input buffer amplifier and a cathode, said first diode being forward-biased through first and second high frequency blocking inductors;

a second diode having a cathode coupled to the cathode of said first diode and an anode, said second diode being forward-biased through third and fourth high frequency blocking inductors; and an output buffer amplifier having an input node coupled to the anode of said second diode and an output node connected to said filter.

6. A subcarrier frequency multiplexed optical transmission system in which a plurality of analog subcarrier signals and at least one digital subcarrier signal are optically transmitted by frequency multiplexing, said system comprising:

an amplitude limiter for limiting the amplitude of the plurality of analog subcarrier signals;

a filter connected to the output of the amplitude limiter for eliminating distortions and noise components in the frequency band of the digital subcarrier signal;

a multiplexer for multiplexing the analog subcarrier signals outputted from the filter and the digital subcarrier signal; and a light source for modulating output signal light intensity according to the analog and digital subcarrier frequency signals outputted from said multiplexer;

said amplitude limiter includes;

an input buffer amplifier having an input node for receiving said plurality of analog subcarrier signals and an output node;

a diode having an anode coupled to the output node of said input buffer amplifier and a cathode, said diode being forward-biased through high frequency blocking inductors; and an output buffer amplifier having an output node coupled to the cathode of said diode and an output node connected to said filter.

7. A subcarrier frequency multiplexed optical transmission system in which a plurality of analog subcarrier signals and at least one digital subcarrier signal are optically transmitted by frequency multiplexing, said system comprising:

an amplitude limiter for limiting the amplitude of the plurality of analog subcarrier signals;

a filter connected to the output of the amplitude limiter for eliminating distortions and noise components in the frequency band of the digital subcarrier signal;

a multiplexer for multiplexing the analog subcarrier signals outputted from the filter and the digital subcarrier signal; and a light source for modulating output signal light intensity according to the analog and digital subcarrier frequency signals outputted from said multiplexer;

said amplitude limiter includes;

an input buffer amplifier having an input node for receiving said plurality of analog subcarrier signals and an output node;

a first diode having an anode coupled to the output node of said input buffer amplifier and a cathode, said first diode being forward-biased through first and second high frequency blocking inductors;

a second diode having a cathode coupled to the cathode of said first diode and an anode, said second diode being forward-biased through third and fourth high frequency blocking inductors; and an output buffer amplifier having an input node coupled to the anode of said second diode and an output node connected to said filter.

8. A subcarrier frequency multiplexed optical transmission system in which a plurality of analog subcarrier signals and at least one digital subcarrier signal are optically transmitted by frequency multiplexing, said system comprising:

an amplitude limiter receiving the plurality of analog subcarrier signals, without the at least one digital subcarrier signal, for limiting the amplitude of the plurality of analog subcarrier signals;

a filter connected to the output of the amplitude limiter for eliminating distortions and noise components in the frequency band of said digital subcarrier signal;

a multiplexer for multiplexing the analog subcarrier signals outputted from the filter and the digital subcarrier signal; and a light source for modulating output signal light intensity according to the analog and digital subcarrier frequency signals outputted from said multiplexer.

* * * * *